(12) United States Patent
Shiraiwa

(10) Patent No.: US 9,746,374 B2
(45) Date of Patent: Aug. 29, 2017

(54) SPECTROPHOTOMETER AND SPECTROPHOTOMETRIC MEASUREMENT METHOD

(71) Applicant: Otsuka Electronics Co., Ltd., Osaka (JP)

(72) Inventor: Hisashi Shiraiwa, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 334 days.

(21) Appl. No.: 14/424,442

(22) PCT Filed: Feb. 26, 2014

(86) PCT No.: PCT/JP2014/054719
§ 371 (c)(1),
(2) Date: Feb. 27, 2015

(87) PCT Pub. No.: WO2014/133018
PCT Pub. Date: Sep. 4, 2014

(65) Prior Publication Data
US 2015/0241276 A1     Aug. 27, 2015

(30) Foreign Application Priority Data
Feb. 28, 2013   (WO) .................. PCT/JP2013/055492

(51) Int. Cl.
*G01J 3/02* (2006.01)
*G01J 3/42* (2006.01)
(Continued)

(52) U.S. Cl.
CPC .............. *G01J 3/0264* (2013.01); *G01J 1/44* (2013.01); *G01J 3/02* (2013.01); *G01J 3/0232* (2013.01);
(Continued)

(58) Field of Classification Search
CPC .. G01J 1/44; G01J 2001/442; G01J 2001/444; G01J 2001/448;
(Continued)

(56) References Cited

U.S. PATENT DOCUMENTS 4,143,770 A * 3/1979 Grimmell ............... B07C 5/368
                                                209/558
4,673,807 A * 6/1987 Kobayashi ......... G01N 21/5907
                                                250/214 AG (Continued)

FOREIGN PATENT DOCUMENTS

CN      1179648 A    4/1998
JP      S59-151026 A 8/1984
(Continued)

OTHER PUBLICATIONS

Partial Translation of the Office Action dated Sep. 7, 2016 for corresponding CN application No. 201480002262.X.
(Continued)

*Primary Examiner* — John Lee
(74) *Attorney, Agent, or Firm* — Hubbs, Enatsky & Inoue PLLC

(57) ABSTRACT

A spectrophotometer includes a photodetection unit configured to convert received light into an electric signal to output the electric signal; a circuit unit including a plurality of gain amplifiers and a plurality of AD converters configured to amplify an output signal from the photodetection unit by a plurality of gains using the plurality of gain amplifiers and configured to convert the amplified output signals into digital signals using the plurality of AD converters to output the digital signals as a plurality of pieces of light amount data; a saturation determination unit configured to determine whether or not each of the plurality of pieces of light amount data from the circuit unit has been saturated; and a measurement result calculation unit configured to calculate, in
(Continued)

accordance with a result of the determination by the saturation determination unit, a measurement result of the received light using a part or all of the plurality of pieces of light amount data.

18 Claims, 8 Drawing Sheets

(51) Int. Cl.
    *G01J 3/28*     (2006.01)
    *G01J 1/44*     (2006.01)

(52) U.S. Cl.
    CPC ........... *G01J 3/0262* (2013.01); *G01J 3/2803* (2013.01); *G01J 3/42* (2013.01); *G01J 2001/444* (2013.01); *G01J 2001/4406* (2013.01); *G01J 2001/448* (2013.01)

(58) Field of Classification Search
    CPC .... G01J 2001/4406; G01J 3/0264; G01J 3/02; G01J 3/0232; G01J 3/0262; G01J 3/2803; G01J 3/42; G01J 2003/425; G01J 3/44; G01J 3/4406
    See application file for complete search history.

(56) References Cited

U.S. PATENT DOCUMENTS

| | | | |
|---|---|---|---|
| 4,909,633 A | 3/1990 | Okui et al. | |
| 5,179,288 A * | 1/1993 | Miffitt | G01N 21/27 250/564 |
| 5,247,169 A * | 9/1993 | Okada | G01N 21/9508 209/582 |
| 5,394,237 A * | 2/1995 | Chang | G01J 3/02 250/339.02 |
| 5,565,990 A | 10/1996 | Hosoi | G01J 3/51 356/404 |
| 5,568,143 A * | 10/1996 | Hutchison | H03M 1/18 341/139 |
| 5,748,302 A | 5/1998 | Unno | |
| 5,949,540 A | 9/1999 | Matsuoka et al. | |
| 6,157,850 A * | 12/2000 | Diab | G06K 9/0051 600/323 |
| 6,334,092 B1 * | 12/2001 | Hashimoto | G01N 21/27 356/328 |
| 6,870,618 B2 * | 3/2005 | Sugimoto | G01J 1/18 356/308 |
| 7,256,384 B2 * | 8/2007 | Gottesman | H03F 3/08 250/214 AG |
| 7,489,398 B2 * | 2/2009 | Otoi | G01J 3/2803 356/319 |
| 2002/0020748 A1 * | 2/2002 | Gu | G06K 9/209 235/462.37 |
| 2003/0142708 A1 | 7/2003 | Sugimoto et al. | |
| 2003/0173514 A1 * | 9/2003 | Syage | H01J 49/0036 250/287 |
| 2006/0086891 A1 * | 4/2006 | Gottesman | H03F 3/08 250/214 A |
| 2007/0081160 A1 * | 4/2007 | Otoi | G01J 3/2803 356/328 |
| 2008/0135735 A1 * | 6/2008 | Gottesman | H03F 3/08 250/214 A |
| 2011/0115499 A1 * | 5/2011 | Chodavarapu | G01R 27/26 324/649 |
| 2012/0175514 A1 * | 7/2012 | Izumi | H01J 49/025 250/281 |
| 2012/0262322 A1 * | 10/2012 | Kelly | H03M 1/145 341/155 |
| 2015/0241276 A1 * | 8/2015 | Shiraiwa | G01J 3/02 250/206 |
| 2017/0059407 A1 * | 3/2017 | Shiraiwa | G01J 3/18 |

FOREIGN PATENT DOCUMENTS

| | | |
|---|---|---|
| JP | S61-250528 A | 11/1986 |
| JP | S63-201538 A | 8/1988 |
| JP | H10-96666 A | 4/1998 |
| JP | 2000-314662 A | 11/2000 |
| JP | 2001-304964 A | 10/2001 |
| JP | 2005-134164 A | 5/2005 |
| JP | 4041559 B2 | 1/2008 |
| WO | 02-088660 A1 | 11/2002 |

OTHER PUBLICATIONS

English Translation of International Search Report for PCT/JP2014/054719 dated Apr. 22, 2014.

European Search Report and European Search Opinion dated Oct. 14, 2016 for corresponding EP application No. 14756395.1.

* cited by examiner

SPECTROPHOTOMETER AND SPECTROPHOTOMETRIC MEASUREMENT METHOD

CROSS REFERENCE TO RELATED APPLICATIONS

This application is a National Stage of International Application No. PCT/JP2014/054719 filed Feb. 26, 2014, which claims priority from International Patent Application No. PCT/JP2013/055492 filed on Feb. 28, 2013. The contents of each of the above documents are incorporated herein by reference in their entirety.

TECHNICAL FIELD

The present invention relates to a spectrophotometer and a spectrophotometric measurement method.

BACKGROUND ART

A so-called spectrophotometer is commonly known, which is configured to irradiate a sample with white light and measure an amount of transmitted light, to thereby measure absorbance of the sample for each wavelength. The spectrophotometer detects a component in the sample by utilizing that the absorbance of the sample differs depending on the concentration of a light-absorbing substance in the sample.

For example, Patent Literature 1 discloses a spectrophotometer to be used for inspection of fruit or vegetables and the like, which is capable of measuring even such an object to be measured that transmits light in an amount greatly different depending on the density and size even in the same kind of fruit or vegetables. Specifically, Patent Literature 1 discloses a spectrophotometer including two light receiving units, that is, a main light receiving unit and a sample light receiving unit, an amplifier, an AD converter, and others. First, a value acquired from the sample light receiving unit and a reference value set in advance are compared with each other, and the gain of an amplifier circuit is appropriately adjusted in accordance with the result of comparison. After that, a value acquired from the main light receiving unit is read as digital data.

CITATION LIST

Patent Literature

[PTL 1] JP 2005-134164 A

SUMMARY

Technical Problems

In the above-mentioned related art, however, for example, precise measurement may not be performed in the case where a measuring wavelength range is wide and a light amount difference is significantly large (for example, in the case where the amount of light differs 100 times to 10,000 times or more depending on measurement positions), such as in the case of measurement of light distribution around an illumination lamp. Further, the above-mentioned related art needs to adjust the gain of the amplifier in measurement, and hence the measurement takes time.

It is an object of one or more embodiments of the present invention to realize a spectrophotometer capable of performing measurement in a shorter period of time with higher precision even in the case of an unknown spectroscopic wavelength distribution in which a measurement range is wide and a light amount difference is large.

Solution to Problems (1) A spectrophotometer including: a photodetection unit configured to convert received light into an electric signal to output the electric signal; a circuit unit including a plurality of gain amplifiers and a plurality of AD converters configured to amplify an output signal from the photodetection unit by a plurality of gains using the plurality of gain amplifiers and configured to convert the amplified output signals into digital signals with use of the plurality of AD converters to output the digital signals as a plurality of pieces of light amount data; a saturation determination unit configured to determine whether or not each of the plurality of pieces of light amount data from the circuit unit has been saturated; and a measurement result calculation unit configured to calculate, in accordance with a result of the determination by the saturation determination unit, a measurement result of the received light using a part or all of the plurality of pieces of light amount data.

(2) The spectrophotometer according to Item (1), in which the measurement result calculation unit calculates the measurement result of the received light based on apart or all of the plurality of pieces of light amount data except for light amount data that is determined to have been saturated by the saturation determination unit.

(3) The spectrophotometer according to Item (2), in which the measurement result calculation unit calculates the measurement result of the received light by dividing a sum of a part or all of the plurality of pieces of light amount data except for the light amount data that is determined to have been saturated by the saturation determination unit by a sum of the plurality of gains corresponding to the part or all of the plurality of pieces of light amount data.

(4) The spectrophotometer according to any one of Items (1) to (3), in which the saturation determination unit determines whether or not each of the plurality of pieces of light amount data has been saturated by light amount data corresponding to a largest gain value among the plurality of gains.

(5) The spectrophotometer according to any one of Items (1) to (4), in which: the circuit unit further comprises a plurality of zero-point adjustment circuits connected to the plurality of gain amplifiers; and each of the plurality of zero-point adjustment circuits outputs, to each of the plurality of gain amplifiers, a signal obtained by reducing a dark current component from an input signal.

(6) The spectrophotometer according to any one of Items (1) to (4), in which, in the circuit unit, a part or all of the plurality of gain amplifiers are connected in a stepwise manner.

(7) The spectrophotometer according to Item (6), in which the circuit unit further comprises an amplifier including an input terminal connected to the photodetection unit and an output terminal connected to a part or all of the plurality of zero-point adjustment circuits.

(8) The spectrophotometer according to any one of Items (1) to (7), further including: a light amount data acquisition unit configured to acquire pieces of light amount data from the plurality of AD converters; and a stray light correction unit configured to correct the measurement result calculated by the measurement result calculation unit based on each of the pieces of light amount data.

(9) The spectrophotometer according to any one of Items (1) to (8), in which the photodetection unit comprises a plurality of light receiving elements each configured to convert the received light into an electric signal, and outputs each of the electric signals for each wavelength band.

(10) The spectrophotometer according to any one of Items (1) to (9), in which the plurality of gains are different from one another.

(11) The spectrophotometer according to any one of Items (1) to (9), in which the plurality of gains are the same as one another.

(12) A spectrophotometric measurement method, including: converting received light into an electric signal to output the electric signal; amplifying an output signal from a photodetection unit by a plurality of gains using a plurality of gain amplifiers, and converting the amplified output signals into digital signals using a plurality of AD converters to output the digital signals as a plurality of pieces of light amount data; determining whether or not each of the plurality of pieces of light amount data has been saturated; and calculating a measurement result of the received light with use of a part or all of the plurality of pieces of light amount data in accordance with a result of the determination.

DESCRIPTION OF EMBODIMENT

Figure 1:
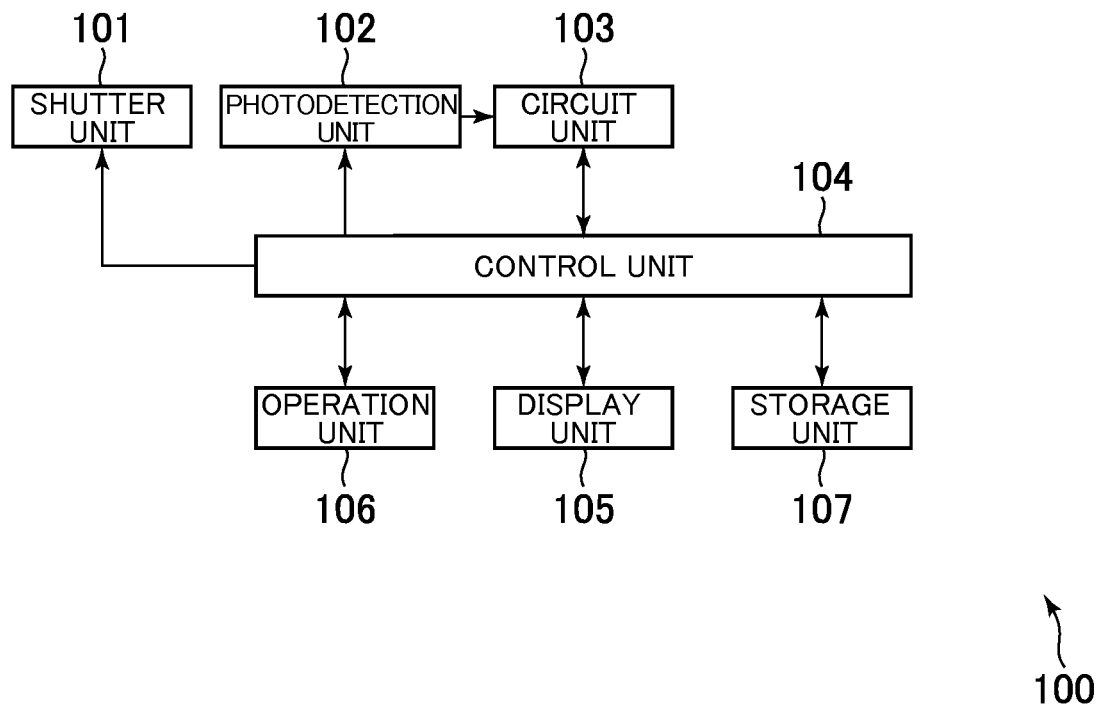
FIG. 1 is a diagram illustrating the outline of a configuration of a spectrophotometer in an embodiment of the present invention.

Now, an embodiment of the present invention is described with reference to the drawings. Note that, in the drawings, the same or similar components are denoted by the same reference symbols, and overlapping description thereof is omitted.

FIG. 1 is a diagram illustrating the outline of a configuration of a spectrophotometer in an embodiment of the present invention. As illustrated in FIG. 1, a spectrophotometer 100 in this embodiment includes, for example, a shutter unit 101, a photodetection unit 102, a circuit unit 103, a control unit 104, a display unit 105, an operation unit 106, and a storage unit 107.

The shutter unit 101 opens and closes a shutter in response to a control signal from the control unit 104, to thereby enable dark current measurement (with the shutter closed) and light amount measurement (with the shutter opened) to be performed.

In the photodetection unit 102, light beams obtained by dispersing light that has passed through a slit portion into respective wavelengths using a dispersion unit, such as a diffraction grating, are simultaneously received by a plurality of detectors (for example, a photodiode array, a CCD, and others). Then, the received light is converted into an electric signal, and the electric signal is output to the circuit unit 103 to be described later for each wavelength (for each channel). In other words, the photodetection unit 102 is a so-called multi-channel photodetector (polychromator), and outputs an electric signal for each channel.

Note that, the photodetection unit 102 may use, for example, a wavelength scanning photodetector (monochromator) that is configured to detect an electric signal for each wavelength by a single detector (for example, a photodiode, a photomultiplier, and others) by changing the wavelength using a dispersion unit, such as rotating a diffraction grating or switching an interference filter.

The circuit unit 103 includes, for example, a plurality of gain amplifiers 203 and a plurality of AD converters (ADCs) 204. Then, the circuit unit 103 uses the plurality of gain amplifiers 203 to amplify an output signal from the photodetection unit 102 by a plurality of gains (for example, gain values that are set for the respective gain amplifiers 203), and uses the plurality of AD converters to convert the amplified signals into digital signals and output the digital signals as a plurality of pieces of light amount data.

Figure 2:
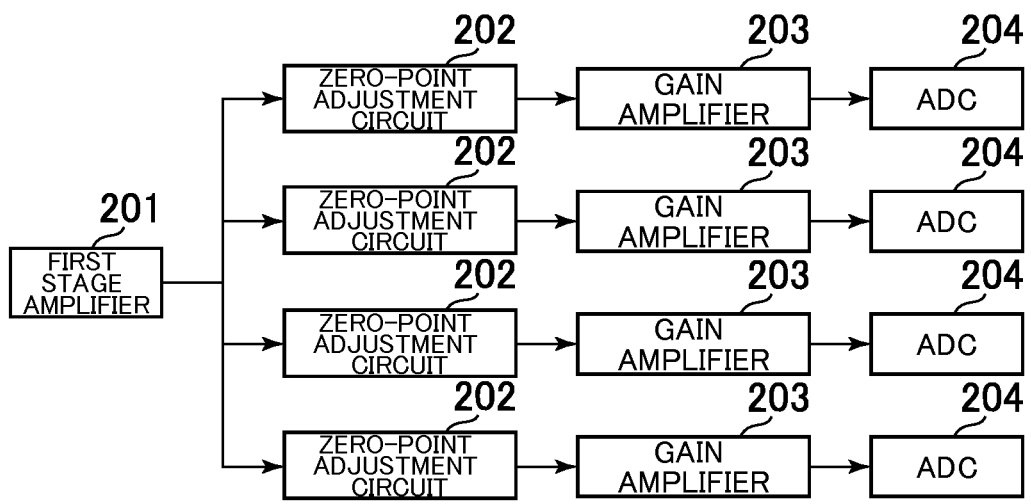
FIG. 2 is a diagram illustrating an example of a configuration of a circuit unit illustrated in FIG. 1.

More specifically, for example, as illustrated in FIG. 2, the circuit unit 103 includes a first stage amplifier 201, a plurality of zero-point adjustment circuits 202, the plurality of gain amplifiers 203, and the plurality of AD converters 204. Note that, the case where the circuit unit 103 includes four zero-point adjustment circuits 202, four gain amplifiers 203, and four ADCs 204 as illustrated in FIG. 2 is described below in order to simplify the description, but it goes without saying that different numbers of the zero-point adjustment circuits 202, the gain amplifiers 203, and the ADCs 204 may be used.

The first stage amplifier 201 converts electric charges accumulated in the photodetection unit 102 into a voltage signal, and outputs the voltage signal to each of the plurality of zero-point adjustment circuits 202.

Each zero-point adjustment circuit 202 is a circuit for performing so-called zero-point adjustment, and reduces a so-called dark current component that flows from the photodetection unit to the ADC in a minimum exposure time.

Each gain amplifier 203 amplifies an output signal from the zero-point adjustment circuit 202 based on each gain value set for each gain amplifier 203, and outputs the amplified signal to each ADC 204. Note that, details of the setting of each gain value and the like are described later.

Each ADC 204 converts each output signal from each gain amplifier 203 into a digital signal, and outputs the digital signal to the control unit 104. Note that, the ADCs 204 may be configured to have the same resolution or different resolutions.

The control unit 104 controls the shutter unit 101, the photodetection unit 102, the circuit unit 103, and the like, and calculates a measurement result of the received light based on the output signals from the respective ADCs 204. Then, for example, the control unit 104 displays the measurement result on the display unit 105. Note that, the details of the functional configuration of the control unit 104 are described later.

The control unit 104 is, for example, a CPU, an MPU, or the like and operates in accordance with programs stored in the storage unit 107. The storage unit 107 includes an information recording medium such as a ROM, a RAM, or a hard disk and is an information recording medium for storing the programs to be executed by the control unit 104. The storage unit 107 also operates as a work memory of the control unit 104. The programs may be downloaded through, for example, a network so as to be provided or may be provided by various types of computer-readable information recording media such as a CD-ROM or a DVD-ROM.

The operation unit 106 includes, for example, a plurality of buttons and a touch panel that is formed integrally with the display unit 105 to be described below. In response to an instruction operation from a user, the operation unit 106 outputs the contents of the instruction operation to the control unit 104.

The display unit 105 is, for example, a liquid crystal display, an organic EL display, or the like, and displays the measurement result and the like in accordance with an instruction from the control unit 104.

Note that, the configuration of the spectrophotometer 100 described above is merely an example and is not limited thereto. For example, the spectrophotometer 100 may further include a communication unit so that the spectrophotometer 100 may communicate to/from an external computer or the like. Further, the first stage amplifier 201 and the zero-point adjustment circuit 202 may be omitted as necessary.

Next, an example of the functional configuration of the control unit 104 in this embodiment is described with reference to FIG. 3. Note that, the following functional configuration of the control unit 104 is merely an example, and this embodiment is not intended to be limited thereto.

Figure 3:
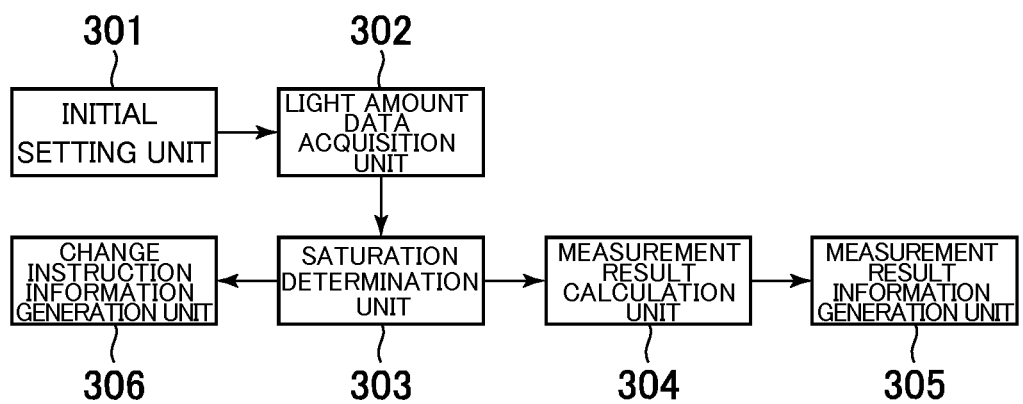
FIG. 3 is a diagram illustrating an example of a functional configuration of a control unit 104 illustrated in FIG. 1.

As illustrated in FIG. 3, the control unit 104 in this embodiment functionally includes an initial setting unit 301, a light amount data acquisition unit 302, a saturation determination unit 303, a measurement result calculation unit 304, a measurement result information generation unit 305, and a change instruction information generation unit 306.

Figure 4:
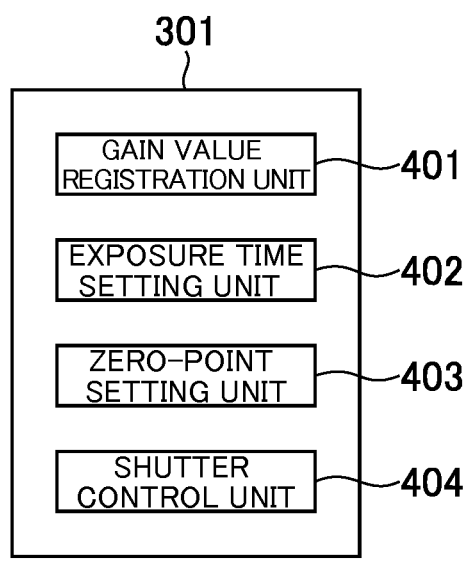
FIG. 4 is a diagram illustrating an example of a functional configuration of an initial setting unit illustrated in FIG. 3.

The initial setting unit 301 performs initial setting, such as setting of an exposure time. Specifically, for example, as illustrated in FIG. 4, the initial setting unit 301 functionally includes a gain value registration unit 401, an exposure time setting unit 402, a zero-point setting unit 403, and a shutter control unit 404.

The gain value registration unit 401, for example, measures light amount data for each channel, and calculates and registers a detailed gain value.

The exposure time setting unit 402, for example, sets an exposure time of the photodetection unit 102 in accordance with an exposure time input via the operation unit 106. Alternatively, the exposure time setting unit 402 automatically adjusts the exposure time depending on the amount of light to be measured.

After the exposure time is set, the shutter control unit 404 closes the shutter of the shutter unit 101. Further, the shutter control unit 404 opens the shutter of the shutter unit 101 when the dark current measurement to be described later is finished.

The zero-point setting unit 403 sets each zero-point adjustment circuit 202 so that the output from each ADC 204 in the minimum exposure time under the state in which the shutter unit 101 is closed may be around zero (zero or more and near zero). Each zero-point adjustment circuit 202 may be manually set.

The light amount data acquisition unit 302 acquires the output signal (light amount data) from each ADC 204. Note that, the case where the circuit unit 103 includes, for example, four zero-point adjustment circuits 202, four gain amplifiers 203, and four ADCs 204 as illustrated in FIG. 2 is described below in order to simplify the description. Further, in the following, the gain values set for the respective gain amplifiers 203 are represented by G1 to G4, and the pieces of light amount data of corresponding ADCs 204 are represented by ADC1 to ADC4. Further, it is assumed that the gain values are set so that $G1<G2<G3<G4$ may be established. In addition, light amount data corresponding to an n-th (n is a natural number) channel (CH) is represented by ADC (n). In addition, the indication (n) of the channel is omitted below in order to simplify the description, but it goes without saying that the same processing is performed for each channel.

The saturation determination unit 303 determines whether or not the light amount data acquired by the light amount data acquisition unit 302 has been saturated. Specifically, in the exposure time setting stage, the saturation determination unit 303 acquires the light amount data (ADC1) that is based on the gain amplifier 203 whose gain value is set to the smallest value (G1) under the state in which the shutter unit 101 is open, and determines whether or not the light amount data has been saturated. Then, when it is determined that the light amount data has been saturated, the change instruction information generation unit 306 issues, for example, an instruction to shorten the exposure time, to thereby set the exposure time that causes no saturation.

On the other hand, when it is determined that the light amount data has not been saturated, the measurement result calculation unit 304 calculates the measurement result of the received light using all the plurality of pieces of light amount data in accordance with the result of determination by the saturation determination unit 303. Specifically, for example, the measurement result calculation unit 304 calculates the measurement result of the received light by dividing the sum of all the plurality of pieces of light amount data except for light amount data that is determined to have been saturated by the saturation determination unit 303 by the sum of the gains corresponding to all the pieces of light amount data.

More specifically, for example, in the measurement result calculation processing, the saturation determination unit 303 determines whether or not each of the pieces of light amount data has been saturated in order from the light amount data (ADC4) for which the largest gain value is set, and when it is determined that the light amount data has not been saturated, the measurement result calculation unit 304 performs weighted addition processing to be described below using all pieces of unsaturated light amount data and the gain values corresponding to the pieces of light amount data. In this manner, more highly precise measurement may be performed as compared with when pieces of light amount data that are determined not to have been saturated are simply used. Further, even when the gains are discontinuous, data between the gains may have continuity. A more specific description is given below.

First, the saturation determination unit 303 determines whether or not the light amount data (ADC4) for which the largest gain value is set has been saturated.

When it is determined that ADC4 has not been saturated, the saturation determination unit 303 controls the measurement result calculation unit 304 to perform weighted addition procession. Specifically, for example, the saturation determination unit 303 controls the measurement result calculation unit 304 to perform weighted addition processing for dividing the sum of ADC4 to ADC1 by the sum of the gain values G1 to G4 corresponding to ADC4 to ADC1 as expressed by the following expression. Note that, in the following expression, CH(n) represents a measurement result for the channel n.

[Math. 1]
$$CH(n) = \frac{ADC1(n) + ADC2(n) + ADC3(n) + ADC4(n)}{G1 + G2 + G3 + G4} \quad (1)$$

On the other hand, when it is determined that ADC4 has been saturated, the saturation determination unit 303 determines whether or not the light amount data (ADC3) for which the second largest gain value is set has been saturated. When it is determined that ADC3 has not been saturated, the saturation determination unit 303 controls the measurement result calculation unit 304 to perform weighted addition processing. Specifically, for example, the saturation determination unit 303 controls the measurement result calculation unit 304 to perform weighted addition processing for dividing the sum of ADC3 to ADC1 by the sum of the gain values G1 to G3 corresponding to ADC3 to ADC1 as expressed by the following expression.

[Math. 2]
$$CH(n) = \frac{ADC1(n) + ADC2(n) + ADC3(n)}{G1 + G2 + G3} \quad (2)$$

After that, the same processing is performed also for ADC2 and ADC1. Note that, it goes without saying that the same processing is performed for all the channels (CHs). Further, more detailed flows of the processing by the saturation determination unit 303 and the measurement result calculation unit 304 are described later.

Based on the measurement result calculated by the measurement result calculation unit 304, for example, the measurement result information generation unit 305 generates measurement result information to be displayed on the display unit 105, and displays the measurement result information on the display unit 105. The measurement result information is displayed in the form of, for example, a graph in which the wavelength is represented on the horizontal axis and the intensity is represented on the vertical axis.

Figure 5:
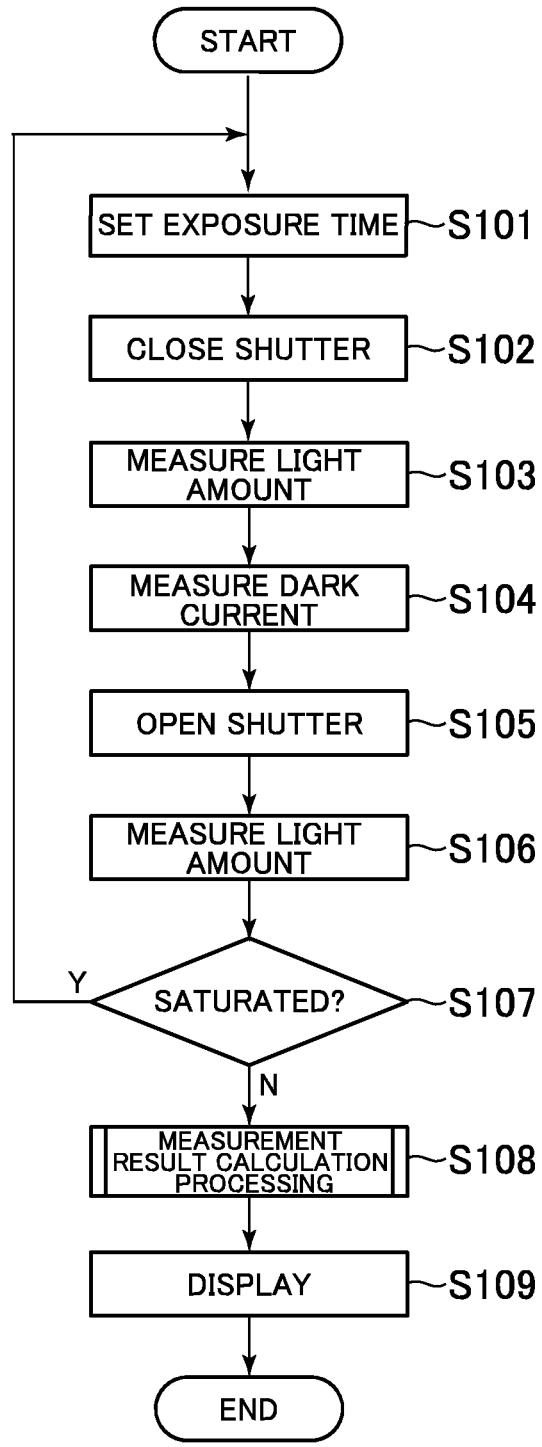
FIG. 5 is a diagram illustrating an example of the outline of a measurement flow in the embodiment of the present invention.

Next, an example of the outline of the measurement flow in this embodiment is described with reference to FIG. 5. Note that the following flow is merely an example, and the measurement flow in this embodiment is not limited to the following.

The exposure time setting unit 402 sets an exposure time of the photodetection unit 102 in accordance with, for example, an exposure time input via the operation unit 106 (S101). The shutter control unit 404 closes the shutter of the shutter unit 101 (S102), and light amount measurement, that is, acquisition of an output signal from each ADC 204 is started (S103). The output signal from each ADC 204 under the state in which the shutter is closed is acquired as dark current data to measure the dark current data (S104). The shutter control unit 404 opens the shutter (S105).

Next, light amount measurement is performed (S106), and the saturation determination unit 303 acquires light amount data (ADC1) that is based on the gain amplifier 203 whose gain value is set to the smallest value (G1) under the state in which the shutter unit 101 is open, and determines whether or not the light amount data has been saturated (S107). Then, when the saturation determination unit 303 determines that the light amount data has been saturated, the flow returns to S101, and the processing from S102 to S107 is performed based on a newly set exposure time.

On the other hand, when the saturation determination unit 303 determines in S106 that the light amount data has not been saturated, measurement result calculation processing is performed (S108). Then, a calculated measurement result is displayed on the display unit 105 (S109).

Next, an example of details of a flow of measurement result calculation processing of S107 is described with reference to FIG. 6. Note that, the following flow of the measurement result calculation processing is merely an example, and the flow of the measurement result calculation processing in this embodiment is not limited to the following.

First, for example, light amount measurement is performed, that is, the pieces of light amount data (ADC1 to ADC4) are acquired from the respective ADCs 204 (S201). Next, the saturation determination unit 303 determines whether or not the light amount data (ADC4) for which the largest gain value is set has been saturated (S202). When it is determined that ADC4 has not been saturated, the saturation determination unit 303 controls the measurement result calculation unit 304 to perform the weighted addition processing expressed in Expression (1) (S203).

On the other hand, when it is determined that ADC4 has been saturated, the saturation determination unit 303 determines whether or not the light amount data (ADC3) for which the second largest gain value is set has been saturated (S204). When it is determined that ADC3 has not been saturated, the saturation determination unit 303 controls the measurement result calculation unit 304 to perform the weighted addition processing expressed in Expression (2) (S205). On the other hand, when it is determined that ADC3 has been saturated, the saturation determination unit 303 determines whether or not the light amount data (ADC2) for which the second largest gain value is set has been saturated (S206). When it is determined that ADC2 has not been saturated, the saturation determination unit 303 controls the measurement result calculation unit 304 to perform the weighted addition processing expressed in Expression (3) (S207).

[Math. 3]
$$CH(n) = \frac{ADC1(n) + ADC2(n)}{G1 + G2} \quad (3)$$

On the other hand, when it is determined that ADC2 has been saturated, the saturation determination unit 303 determines whether or not the light amount data (ADC1) for which the second largest gain value is set has been saturated (S208). When it is determined that ADC1 has been saturated, the flow returns to S102. On the other hand, when it is determined that ADC1 has not been saturated, the saturation determination unit 303 controls the measurement result calculation unit 304 to perform weighted addition processing expressed in Expression (4) (S209).

[Math. 4]

$$CH(n) = \frac{ADC1(n)}{G1} \quad (4)$$

Note that, the processing only for one channel has been described above in order to simplify the description, but it goes without saying that the same processing is performed for all the channels. Further, the case where the circuit unit 103 includes four zero-point adjustment circuits 202, four gain amplifiers 203, and four ADCs 204 has been described above in order to simplify the description, but it goes without saying that the same processing is performed even in the case where the circuit unit 103 includes different numbers of the zero-point adjustment circuits 202, the gain amplifiers 203, and the ADCs 204.

According to this embodiment, it is possible to realize a spectrophotometer capable of performing measurement in a shorter period of time with higher precision even in the case of an unknown spectroscopic wavelength distribution in which a measuring wavelength range is wide and a light amount difference is large depending on measurement positions.

The present invention is not intended to be limited to the above-mentioned embodiment, and various modifications may be made. For example, the present invention may be replaced with substantially the same configuration as that illustrated in the above-mentioned embodiment, a configuration that provides the same functions and effects, or a configuration that may achieve the same object.

For example, in the above description of the measurement result calculation processing, the saturation determination unit 303 determines whether or not each of the pieces of light amount data has been saturated in order from the light amount data (ADC4) for which the largest gain value is set, and the weighted addition processing is performed using all the pieces of light amount data that are determined not to have been saturated and the gain values corresponding to the pieces of light amount data. Alternatively, however, for example, the measurement result of the received light may be calculated using a part of the plurality of pieces of light amount data in accordance with the result of determination by the saturation determination unit 303. In other words, the weighted addition processing may be performed using the light amount data that is determined not to have been saturated and a part of pieces of light amount data that are based on the outputs of the gain amplifiers 203 whose gain values are smaller than that for the light amount data, and using the corresponding gain values.

Specifically, for example, when it is determined that ADC4 has not been saturated in the above-mentioned example, weighted addition processing may be performed as expressed in Expression (5) based on the pieces of light amount data of ADC4 and ADC3 and the gain values corresponding to ADC4 and ADC3. In this case, the processing load on the measurement result calculation unit 304 may be reduced as compared with the above-mentioned embodiment.

[Math. 5]

$$CH(n) = \frac{ADC3(n) + ADC4(n)}{G3 + G4} \quad (5)$$

Further, instead of the above-mentioned weighted addition processing, the measurement result may be calculated using only light amount data that is determined not to have been saturated, and may be displayed as the measurement result. Specifically, for example, when it is determined that ADC4 has not been saturated, the measurement result calculation unit 304 divides ADC4 by G4 to calculate the measurement result, and when it is determined that ADC3 has not been saturated, the measurement result calculation unit 304 divides ADC3 by G3 to calculate the measurement result. In this case, the processing load on the measurement result calculation unit 304 may be further reduced.

In addition, the case where the gain values of the respective gain amplifiers 203 are set to be different from one another has been described above, but the gain values of the respective gain amplifiers 203 may be set to 1. This case is equivalent to the case of increasing the resolution of the ADCs 204, and, for example, such light that hardly changes in intensity in the measurement range may also be measured more precisely.

MODIFIED EXAMPLE 1

Figure 7:
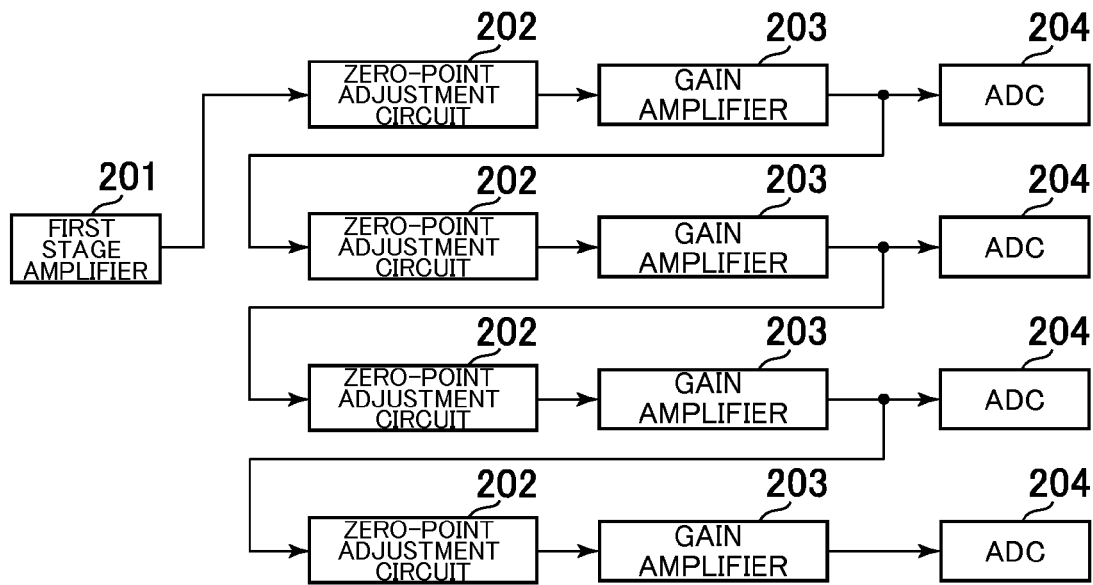
FIG. 7 is a diagram illustrating Modified Example 1 of the present invention.

FIG. 7 is a diagram illustrating Modified Example 1 of the present invention. This modified example differs from the above-mentioned embodiment in the configuration of the circuit unit 103. The other parts are the same as those in the above-mentioned embodiment, and a description of the same parts is omitted.

Similarly to the above-mentioned embodiment, the circuit unit 103 in this modified example includes, as illustrated in FIG. 7, for example, a first stage amplifier 201, a plurality of zero-point adjustment circuits 202, a plurality of gain amplifiers 203, and a plurality of ADCs 204. However, this modified example differs in that the zero-point adjustment circuits 202 and the gain amplifiers 203 are connected in a stepwise manner. Note that, in the following, the zero-point adjustment circuits 202, the gain amplifiers 203, and the ADCs 204 are referred to as "first zero-point adjustment circuit 202", "first gain amplifier 203", and "first ADC 204", "second zero-point adjustment circuit 202", "second gain amplifier 203", and "second ADC 204", . . . , respectively, in order from the top of FIG. 7.

Specifically, in this modified example, for example, the first stage amplifier 201 is connected only to the first zero-point adjustment circuit 202 as illustrated in FIG. 7. Then, an output of the first gain amplifier 203 is connected to an input of the second zero-point adjustment circuit 202, an output of the second gain amplifier 203 is connected to an input of the third zero-point adjustment circuit 202, and an output of the third gain amplifier 203 is connected to an input of the fourth zero-point adjustment circuit 202. In this manner, the use of a gain amplifier 203 having a high gain can be avoided. The other points are the same as those in the above-mentioned embodiment, and hence a description thereof is omitted. Note that, it goes without saying that the gain values G1 to G4 in the above-mentioned embodiment correspond to the actual gains with which the gain amplifiers 203 after being connected in a stepwise manner as described above amplify. For example, when the gain values of the respective gain amplifiers 203 in this modified example are 1, 5, 5, and 5, the gain values in the above-mentioned embodiment correspond to 1, 5, 25, and 125. Further, the gains in the appended claims correspond to the actual gains (in the case of the above-mentioned example, 1, 5, 25, and 125) of the gain amplifiers in the respective stages in this modified example.

MODIFIED EXAMPLE 2

Figure 8:
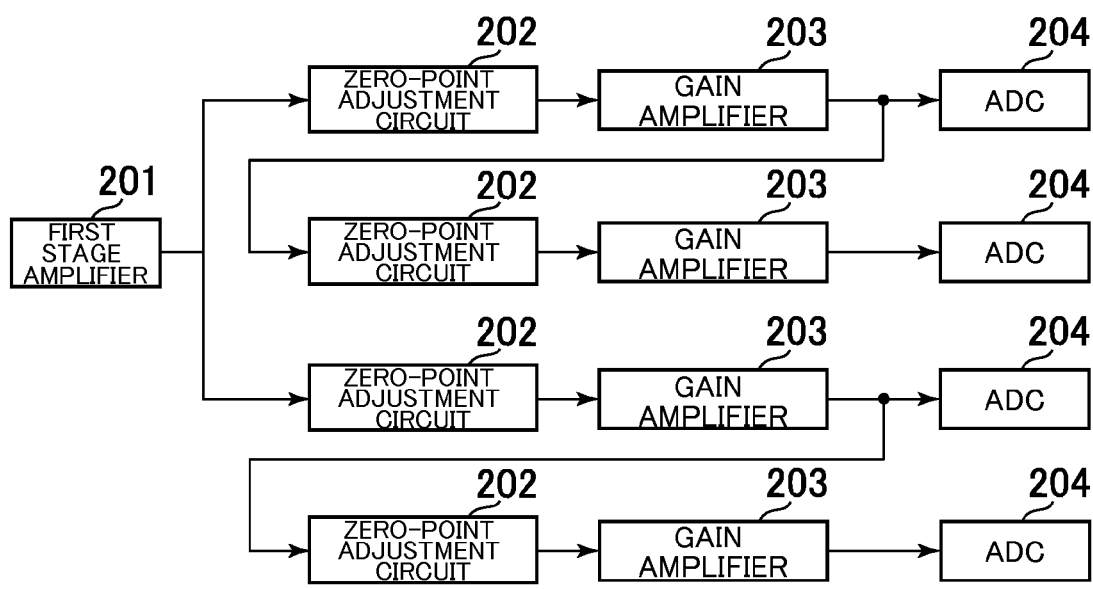
FIG. 8 is a diagram illustrating Modified Example 2 of the present invention.

FIG. 8 is a diagram illustrating Modified Example 2 of the present invention. This modified example differs from Modified Example 1 in the configuration of the circuit unit 103. The other parts are the same as those in Modified Example 1, and a description of the same parts is omitted.

Similarly to Modified Example 1, the circuit unit 103 in this modified example includes, as illustrated in FIG. 8, for example, a first stage amplifier 201, a plurality of zero-point adjustment circuits 202, a plurality of gain amplifiers 203, and a plurality of ADCs 204.

However, this modified example differs in that the zero-point adjustment circuits 202 and the gain amplifiers 203 are partially connected in a stepwise manner. Specifically, for example, the output of the first stage amplifier 201 is connected to the inputs of the first and third zero-point adjustment circuits 202 as illustrated in FIG. 8. Further, the output of the first gain amplifier 203 is connected to the input of the second zero-point adjustment circuit 202. Further, the output of the third gain amplifier 203 is connected to the input of the fourth zero-point adjustment circuit 202. In this manner, the use of an amplifier having a high gain can be avoided, and the entry of noise in a stepwise manner can be prevented as compared with Modified Example 1.

The configurations of the circuit unit 103 illustrated in the above-mentioned embodiment and Modified Examples 1 and 2 are merely an example, and the present invention is not intended to be limited thereto. Other connections may be used.

MODIFIED EXAMPLE 3

Figure 9:
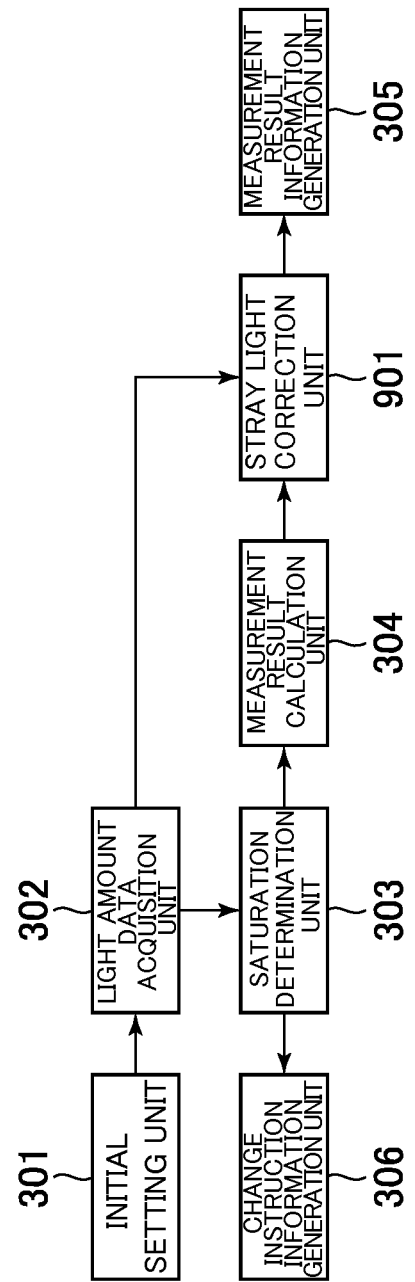
FIG. 9 is a diagram illustrating Modified Example 3 of the present invention.

FIG. 9 is a diagram illustrating Modified Example 3 of the present invention. This modified example differs from the above-mentioned embodiment in the functional configuration of the circuit unit 104. The other parts are the same as those in the above-mentioned embodiment, and a description of the same parts is omitted.

As illustrated in FIG. 9, the control unit 104 in this modified example further includes a stray light correction unit 901. Based on a stray light component acquired by the light amount data acquisition unit 302 and a stray light distribution function, the stray light correction unit 901 corrects an output signal (output result signal) output from the measurement result calculation unit 304 so that the stray light component is removed. Specifically, for example, the following expressions may be used to acquire a stray-light-corrected measurement result.

[Math. 6]
$$M = A \times IB \quad (6)$$

[Math. 7]
$$CH = IB + A \times IB = [I+A] \times IB \quad (7)$$

[Math. 8]
$$IB = [I+A]^{-1} \times CH = C \times CH \quad (8)$$

where A represents a stray light distribution function matrix, IB represents a column vector of a stray-light-corrected spectrum, CH represents a column vector of a measurement signal spectrum, M represents a column vector of a total stray light amount spectrum, and I represents a unit matrix. C represents a stray light correction matrix of n×n, and [I+A] represents an inverse matrix. Further, CH corresponds to a measurement result signal output from the measurement result calculation unit 304. If the stray light correction matrix C is calculated once, the stray-light-corrected spectrum IB can be easily calculated as IB=C×CH in the subsequent spectrum measurement. Note that, it is desired to measure the stray light distribution function with use of a tunable laser, for example. This is because an optical output other than a designated wavelength is smaller with the use of a tunable laser than with the use of a light source and a monochromator.

According to this modified example, it is possible to realize a spectrophotometer capable of performing measurement in a shorter period of time with higher precision even in the case where the spectroscopic measurement range is large, and in addition, the stray light can be corrected more precisely. Further, the stray light component can be detected without the need of additionally performing a plurality of times of detection while varying the exposure time unlike the related art.

Figure 6:
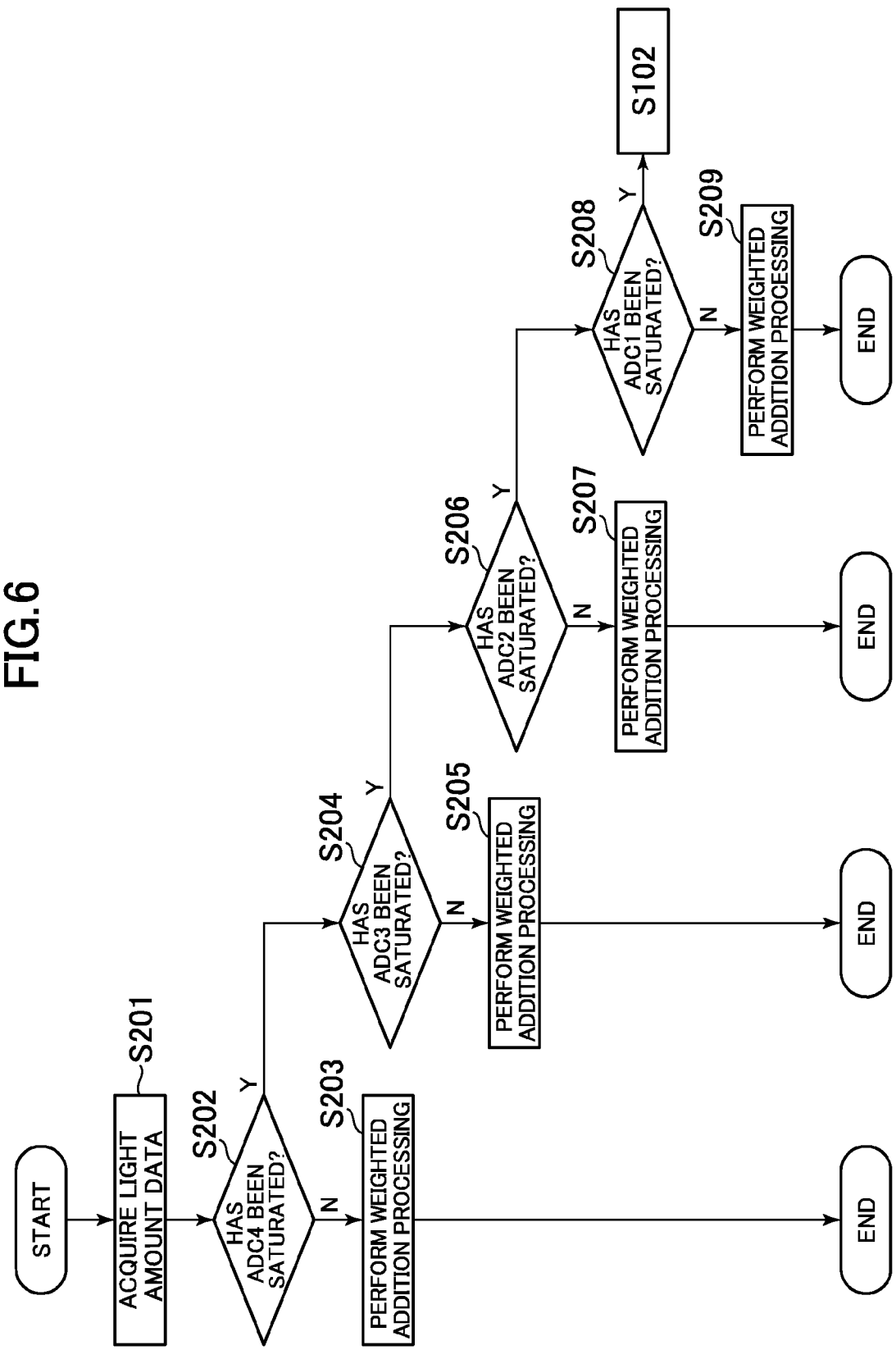
FIG. 6 is a diagram illustrating an example of details of a flow of measurement result calculation processing illustrated in FIG. 5.
Figure 10:
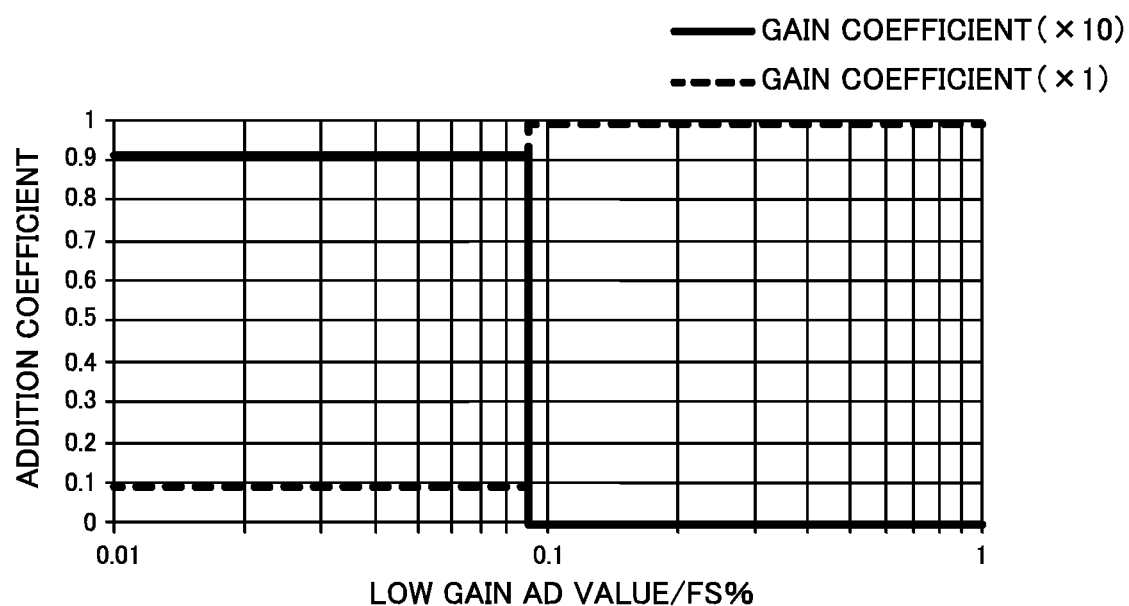
FIG. 10 is a graph showing switching of calculation of weighted addition processing, which corresponds to the case of the above-mentioned embodiment.
Figure 11:
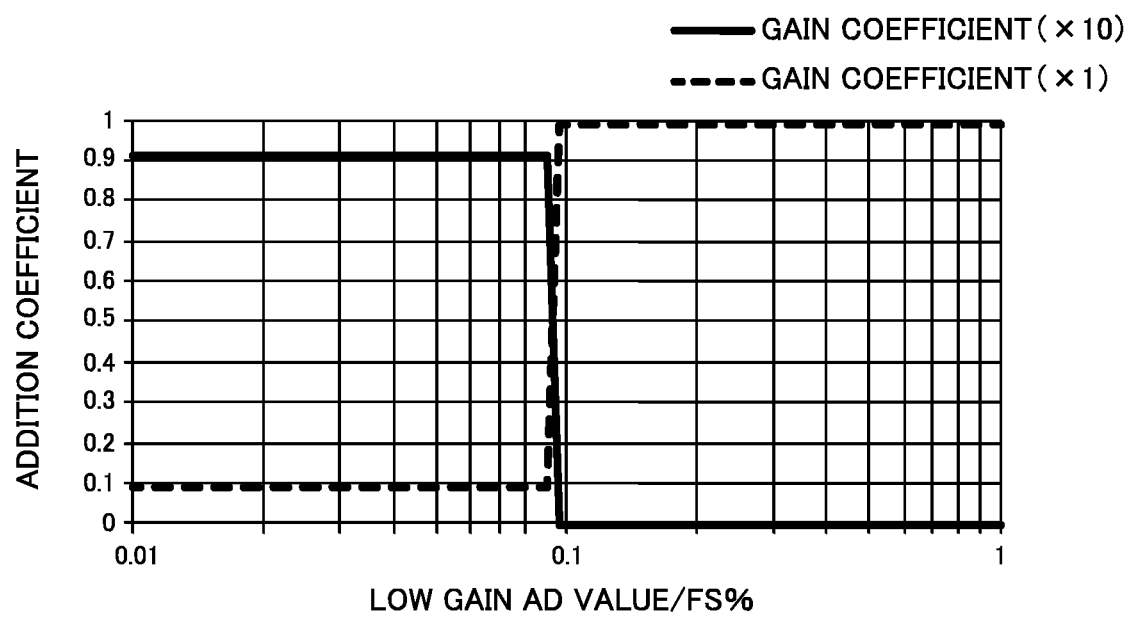
FIG. 11 is a graph showing a modified example in which an addition coefficient is set so as to change smoothly within a predetermined range at the time of switching of weighted addition processing.
Figure 12:
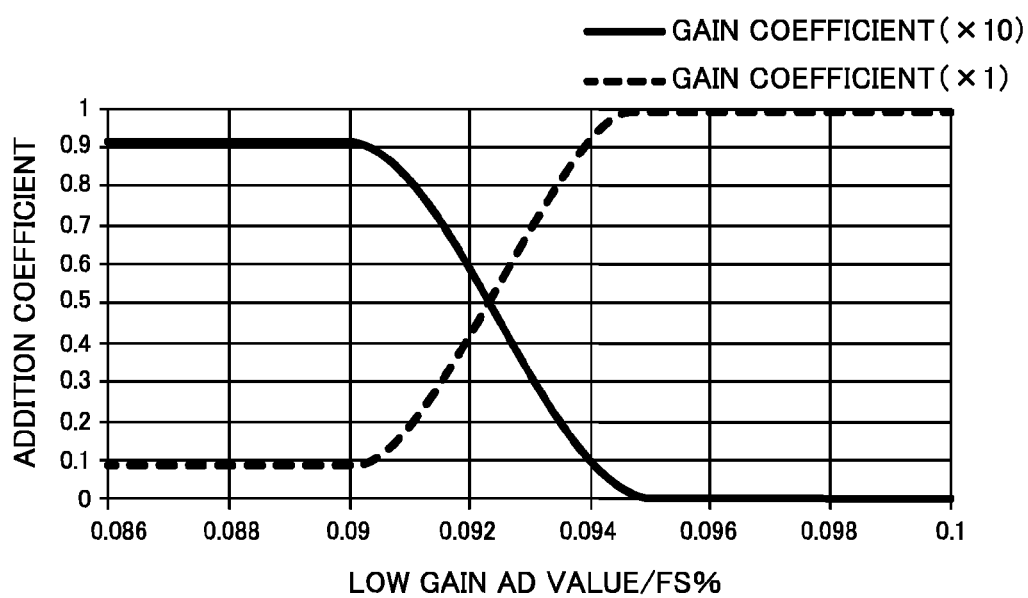
FIG. 12 is a graph showing a modified example in which an addition coefficient is set so as to change smoothly within a predetermined range at the time of switching of weighted addition processing.
Figure 13:
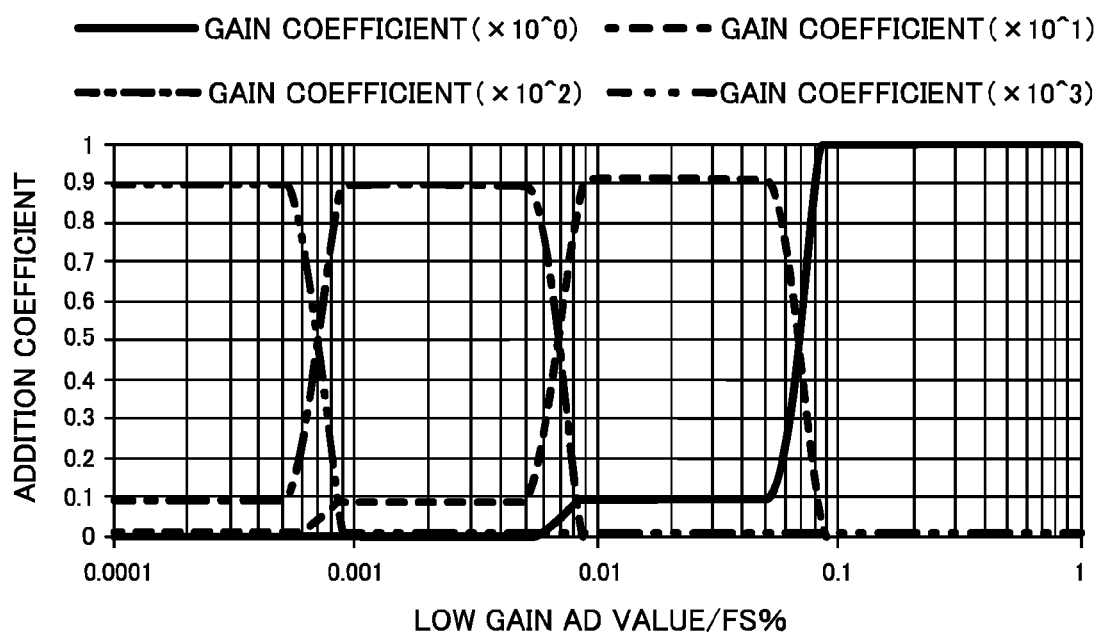
FIG. 13 is a graph showing a modified example in which an addition coefficient is set so as to change smoothly within a predetermined range at the time of switching of weighted addition processing.

Note that, a description has been given of the case where, for example, as shown in S203 and S205 of FIG. 6, the calculation of the weighted addition processing is switched depending on the presence/absence of saturation of light amount data amplified by the corresponding gain value, such as performing addition processing involving the weighted addition processing of Expression (1) when it is determined that the light amount data ADC4 has not been saturated, and performing addition processing involving the weighted addition processing of Expression (2) when it is determined that the light amount data ADC4 has been saturated but the light amount data ADC3 has not been saturated. Alternatively, however, the addition coefficient may be set so as to smoothly change within a predetermined range at the time of switching of weighted addition processing. A specific description is given below with reference to FIGS. 10 to 13 in comparison with the case of the above-mentioned embodiment. Note that, FIG. 10 is a graph showing the switching of the calculation of the weighted addition processing, which corresponds to the case of the above-mentioned embodiment. FIGS. 11 to 13 are graphs each showing a modified example in which the addition coefficient is set so as to change smoothly within a predetermined range at the time of the switching of the weighted addition processing.

As shown in FIG. 10, in the case where the gain amplifier 203 having a gain coefficient of 1 (G1) and the gain amplifier 203 having a gain coefficient of 10 (G2) are used, for example, until the light amount data that is input to the ADC 204 corresponding to G2 is saturated (until 0.09 on the horizontal axis of FIG. 10 is reached (the value determined when the value with which the light amount data for G1 is saturated is 1)), the light amount data corresponding to G1 and the light amount data corresponding to G2 are subjected to weighted addition as expressed in Expression (3). Then, when the light amount data that is input to the ADC 204 corresponding to G2 is saturated, the calculation of weighted addition processing is switched so as to perform the calculation expressed in Expression (4) using the light amount data corresponding to the gain coefficient of 1 (G1). Note that, the vertical axis of FIG. 10 corresponds to the normalized addition coefficient to be multiplied with the light amount data. Specifically, the addition coefficient corresponds to G1/(G1+G2) when the gain coefficient is G1, and corresponds to G2/(G1+G2) when the gain coefficient is G2.

In contrast, for example, as shown in FIGS. 11 and 12, the above-mentioned addition coefficient may be set so as to smoothly change within a predetermined range where light amount data is saturated (for example, 0.09 to 0.095 in the case of the above-mentioned example). In this manner, even before and after the calculation expression used for the weighted addition processing (for example, before and after the switching from Expression (3) to Expression (4)), the fluctuations in the measurement result due to an error of the gain of the operational amplifier 203 can be reduced. Note that, FIG. 12 is an enlarged graph of a part of FIG. 11. As understood from FIG. 12, the addition coefficient is set so as to change smoothly at the time of the switching of weighted addition processing. Specifically, for example, the addition coefficient is set so as to change smoothly using a cosine wave or the like.

Further, the case where the calculation of the measurement result with use of two gain values is switched to the calculation of the measurement result with use of a single gain value has been described above in order to simplify the description. Alternatively, however, for example, as shown in FIG. 13, the addition coefficient may be set so as to change smoothly within a predetermined range where light amount data is saturated at the timing of each switching of weighted addition processing, as exemplified by the case where the calculation of the measurement result with use of four gain values is switched to the calculation of the measurement result with use of three gain values, and the case where the calculation of the measurement result with use of three gain values is switched to the calculation of the measurement result with use of two gain values.

The present invention is not limited to the embodiment and Modified Examples 1 to 3 described above, and various modifications can be made thereto. For example, the present invention may be replaced with substantially the same configuration as that illustrated in the above-mentioned embodiment, a configuration that provides the same functions and effects, or a configuration that achieves the same object. It is needless to say that, for example, Modified Examples 1 to 2 and Modified Example 3 may be adopted in combination.

The invention claimed is:

1. A spectrophotometer, comprising:
   a photodetection unit configured to convert received light into an electric signal to output the electric signal;
   a circuit unit comprising a plurality of gain amplifiers and a plurality of AD converters configured to amplify an output signal from the photodetection unit by a plurality of gains using the plurality of gain amplifiers and configured to convert the amplified output signals into digital signals using the plurality of AD converters to output the digital signals as a plurality of pieces of light amount data;
   a saturation determination unit configured to determine whether or not each of the plurality of pieces of light amount data from the circuit unit has been saturated; and
   a measurement result calculation unit configured to calculate, in accordance with a result of the determination by the saturation determination unit, a measurement result of the received light using a part or all of the plurality of pieces of light amount data;
   wherein the measurement result calculation unit calculates the measurement result of the received light by dividing a sum of a part or all of the plurality of pieces of light amount data except for the light amount data that is determined to have been saturated by the saturation determination unit by a sum of the plurality of gains corresponding to the cart or all of the plurality of pieces of light amount data.

2. The spectrophotometer according to claim 1, wherein the measurement result calculation unit calculates the measurement result of the received light based on a part or all of the plurality of pieces of light amount data except for light amount data that is determined to have been saturated by the saturation determination unit.

3. The spectrophotometer according to claim 1, wherein the saturation determination unit determines whether or not each of the plurality of pieces of light amount data has been saturated by light amount data corresponding to a largest gain value among the plurality of gains.

4. The spectrophotometer according to claim 1, wherein:
   the circuit unit further comprises a plurality of zero-point adjustment circuits connected to the plurality of gain amplifiers; and
   each of the plurality of zero-point adjustment circuits outputs, to each of the plurality of gain amplifiers, a signal obtained by reducing a dark current component from an input signal.

5. The spectrophotometer according to claim 1, wherein, in the circuit unit, a part or all of the plurality of gain amplifiers are connected in a stepwise manner.

6. The spectrophotometer according to claim 4, wherein the circuit unit further comprises an amplifier including an input terminal connected to the photodetection unit and an output terminal connected to a pan or all of the plurality of zero-point adjustment circuits.

7. The spectrophotometer according to claim 1, further comprising:
   a light amount data acquisition unit configured to acquire pieces of light amount data from the plurality of AD conveners; and
   a stray light correction unit configured to correct the measurement result calculated by the measurement result calculation unit based on each of the pieces of light amount data.

8. The spectrophotometer according to claim 1, wherein the photodetection unit comprises a plurality of light receiving elements each configured to convert the received light into an electric signal, and outputs each of the electric signals corresponding to respective wavelength bands.

9. The spectrophotometer according to claim 1, wherein the plurality of gains are different from one another.

10. The spectrophotometer according to claim 1, wherein the plurality of gains are the same as one another.

11. A spectrophotometric measurement method, comprising:
    converting received light into an electric signal to output the electric signal;
    amplifying an output signal from a photodetection unit by a plurality of gains using a plurality of gain amplifiers, and converting the amplified output signals into digital signals using a plurality of AD converters to output the digital signals as a plurality of pieces of light amount data;
    determining whether or not each of the plurality of pieces of light amount data has been saturated; and calculating a measurement result of the received light using a part or all of the plurality of pieces of light amount data in accordance with a result of the determination;

wherein the measurement result calculation unit calculates the measurement result of the received light by dividing a sum of a part or all of the plurality of pieces of light amount data except for the light amount data that is determined to have been saturated by the saturation determination unit by a sum of the plurality of gains corresponding to the part or all of the plurality of pieces of light amount data.

12. The spectrophotometer according to claim 2, wherein the saturation determination unit determines whether or not each of the plurality of pieces of light amount data has been saturated by light amount data corresponding to a largest gain value among the plurality of gains.

13. The spectrophotometer according to claim 2, wherein:
the circuit unit further comprises a plurality of zero-point adjustment circuits connected to the plurality of gain amplifiers; and
each of the plurality of zero-point, adjustment circuits outputs, to each of the plurality of gain amplifiers, a signal obtained by reducing a dark current component from an input signal.

14. The spectrophotometer according to claim 1, wherein:
the circuit unit further comprises a plurality of zero-point adjustment circuits connected to the plurality of gain amplifiers; and
each of the plurality of zero-point adjustment circuits outputs, to each of the plurality of gain amplifiers, a signal obtained by reducing a dark current component from an input signal.

15. The spectrophotometer according to claim 3, wherein:
the circuit unit further comprises a plurality of zero-point adjustment circuits connected to the plurality of gain amplifiers; and
each of the plurality of zero-point adjustment circuits outputs, to each of the plurality of gain amplifiers, a signal obtained by reducing a dark current component from an input signal.

16. The spectrophotometer according to claim 2, wherein in the circuit unit, a part or all of the plurality of gain amplifiers are connected in a stepwise manner.

17. The spectrophotometer, according to claim 1, wherein, in the circuit unit, a part or all of the plurality of gain amplifiers are connected in a stepwise manner.

18. The spectrophotometer according to claim 3, wherein, in the circuit unit, a part or all of the plurality of gain amplifiers are connected in a stepwise manner.

* * * * *